(12) United States Patent
Bahammam et al.

(10) Patent No.: US 11,179,230 B1
(45) Date of Patent: Nov. 23, 2021

(54) INTERDENTAL CLEANSING DEVICE

(71) Applicant: King Abdulaziz University, Jeddah (SA)

(72) Inventors: Maha Ahmed Salim Bahammam, Jeddah (SA); Seba Abdulqader Salem Alhebshi, Jeddah (SA)

(73) Assignee: King Abdulaziz University, Jeddah (SA)

( * ) Notice: Subject to any disclaimer, the term of this patent is extended or adjusted under 35 U.S.C. 154(b) by 0 days.

(21) Appl. No.: 17/062,908

(22) Filed: Oct. 5, 2020

(51) Int. Cl.
*A61C 15/04* (2006.01)
*A46B 15/00* (2006.01)

(52) U.S. Cl.
CPC ........ *A61C 15/046* (2013.01); *A46B 15/0069* (2013.01)

(58) Field of Classification Search
CPC ....... A61C 15/00; A61C 15/04; A61C 15/041; A61C 15/042; A61C 15/043; A61C 15/046; A61C 15/047; A61C 15/048; A61C 17/228; A61C 17/0211; A61C 17/0208; A46B 15/0069; A46B 15/0071; A46B 15/0073
USPC ....... 132/321, 322, 324, 325, 326, 327, 328, 132/329, 309; D28/65–68; D24/180; D29/108
See application file for complete search history.

(56) References Cited

U.S. PATENT DOCUMENTS

| | | | | |
|---|---|---|---|---|
| 4,237,574 A | * | 12/1980 | Kelly | A46B 9/045 15/167.2 |
| 2005/0133057 A1 | * | 6/2005 | Kirstein | A61C 15/046 132/323 |
| 2006/0014121 A1 | * | 1/2006 | DelGrosso | A61C 15/046 433/216 |
| 2013/0067665 A1 | * | 3/2013 | Sowinski | A61C 17/228 15/4 |
| 2013/0220356 A1 | * | 8/2013 | Sahoo | A61C 15/046 132/200 |
| 2014/0261511 A1 | * | 9/2014 | Nibbe | A61C 15/046 132/200 |
| 2015/0250571 A1 | * | 9/2015 | Oelgiesser | A61C 17/228 15/22.2 |
| 2017/0156830 A1 | * | 6/2017 | Wallace | A61C 15/046 |
| 2019/0357667 A1 | * | 11/2019 | Beckman | A46B 15/0002 |
| 2020/0138180 A1 | * | 5/2020 | Arbeitman | A61C 17/3481 |
| 2020/0253702 A1 | * | 8/2020 | Gentile | A46B 15/0012 |
| 2021/0100645 A1 | * | 4/2021 | Speicher | A61C 19/066 |

* cited by examiner

*Primary Examiner* — Rachel R Steitz
*Assistant Examiner* — Karim Asqiriba
(74) *Attorney, Agent, or Firm* — W&C IP

(57) ABSTRACT

A device for cleansing the teeth is provided. The device that improves the ability of the user to quickly, efficiently and thoroughly floss all interproximal spaces at once.

13 Claims, 10 Drawing Sheets

INTERDENTAL CLEANSING DEVICE

BACKGROUND OF THE INVENTION

Field of the Invention

The invention generally relates to a device for cleansing the teeth. In particular, the invention provides a device that improves the ability of the user to quickly, efficiently and thoroughly floss all interproximal spaces at once.

Description of Related Art

The oral cavity is an environment that is considered an optimal habitat for many organisms. Dental pellicles normally form on the tooth and offer bacteria a surface to which they attach. Within hours of formation, bacteria loosely bind to the pellicle. These bacteria multiply and spread throughout the entire mouth.

Invasive oral pathogens that colonize dental plaque biofilm on the tooth and root surfaces are the initiating factors for gingival and periodontal infections. (1) Good oral hygiene practices are considered crucial for good oral health, and flossing is considered an essential part of a proper oral hygiene routine.

Not only does proper and consistent plaque control lead to the disappearance of clinical signs and symptoms of gingivitis, (2) it also enhances better patient health in general: it has been proven that the use of floss/interdental brushes is associated with a lower risk for new cardiovascular events among patients with coronary heart disease (3). The current and most common method of plaque control includes tooth brushing. However, it has been shown that even the best toothbrushes can only clean about 60% of the tooth surface, leaving behind a huge amount of plaque in the interproximal area, which is difficult to remove with the use of only a toothbrush. (4) It has also been reported in previous studies that brushing alone results in inefficient plaque removal to prevent gingivitis and periodontitis. (5) Given the large percentage of nomadic/rural Saudis without access to dental care or dental health education, a high prevalence of caries in this group might be expected, and a high prevalence of periodontal disease, with a mean incidence of "intense gingivitis" of 2.3±1.79 and an absence of advanced periodontitis has been reported for this group [6]. In a study titled "A knowledge, attitude, and practices study regarding dental floss among dentists in India" it was stated that there is an absence of appropriate knowledge regarding dental floss even among dentists in India, as only 78% of the dentists agreed that routine use of dental floss is necessary for good periodontal health. Many of the dentists had a total absence of awareness, availability and education in regard to the topic of the dental floss. A total of 15.3% of the dentists who responded to the survey had never used dental floss before. It is only after consideration of the patient's education, occupation and socioeconomic status that dental floss is prescribed, according to 63.9% of the dentists in India. (7) Proper oral hygiene education is a major factor that affects the prognosis of the entire dental treatment and should be available to all patients equally regardless of their socioeconomic background. Another study compared the use of interdental cleaning devices in addition to tooth brushing for preventing and controlling periodontal disease and dental caries and concluded that the use of supplementary devices may reduce gingivitis and plaque more than tooth brushing alone. It was evident that cleaning sticks and oral irrigators provided limited and erratic results. (8)(9)(10). Thus, supplementary methods of plaque removal (e.g. dental floss) are very important for complete cleansing of all surfaces of the teeth. The main disadvantage associated with flossing is with the individual's inability to implement flossing on a regular basis as part of their daily oral hygiene routine due to their lack of motivation. (11) (12) A study showed that individuals do not prefer the use of a conventional dental floss, nor feel proficient with doing it, and if given another interdental flossing device, they would choose it over the conventional floss. (13) A two-week, randomized, single blinded study proved that adolescents using an interactive power toothbrush with Bluetooth technology displayed notably greater plaque reduction in all tested areas. Adolescents even used the interactive power toothbrush with Bluetooth technology for a longer time than the manual toothbrush. This new technology appeals more to adolescents thus resulting in better tooth brushing efficacy, duration and compliance within this population. (14) Nowadays, many interdental flossing alternatives have been tested and showed better patient acceptance and compliance with equal plaque removal efficacy. (15) A study compared the efficacy of a flossing aid called (Flosser® by Oral-B) to conventional finger flossing. Ultimately, it was found that there was no statistical significance between the group differences in gingival inflammation and plaque removal. Nonetheless, patients preferred the flossing aid over conventional finger flossing. (16) A randomized clinical trial was done to compare the conventional flossing technique to a new device (Quik Floss®) and concluded that Quik Floss® was a safe and effective alternative to the conventional method with respect to plaque removal. In addition, the study highlighted that patients preferred the new device over the conventional way and left many positive comments. (17) Other studies compared the efficacy and safety of using the conventional finger floss method using waxed versus unwaxed floss and concluded that both waxed and unwaxed flosses show similar clinical efficiency. However, the general preference of the population tends to lean towards the purchase of waxed dental floss over unwaxed dental floss. (18) (19) In a study done in Iran to evaluate the effect of brushing/flossing sequence in plaque removal, it was concluded that flossing followed by brushing is more effective in removal of interdental plaque than brushing followed by flossing. (20) In a study done in São Paulo, Brazil, where 36 children and 59 adolescents were selected to measure and evaluate their general oral hygiene, a questionnaire was distributed to assess the difficulties and self-reported motivation, and previous instruction in regard to dental flossing. The subjects were observed by an examiner regarding how they flossed their teeth and their possible faults were documented. The results found that the children's flossing negligence was strongly related to self-reported laziness in flossing (p=0.02), and negatively related to their previous experience with some dentists (p=0.009). Self-described troubles in flossing also presented an association with laziness in flossing (p=0.03). Low compliance and difficulties in flossing among children and adolescents seemed to be more related to lack of motivation, although problems concerning manual skills were also observed. (21) In a clinical study that was conducted at the faculty of Dentistry at the University of Seville, a new flossing device was tested on 35 male and female subjects. The flossing device is a flossing loop that is held between two fingers to facilitate easier flossing. The data collected indicated that the rate of Turesky's Plaque Index presented statistically significant differences between groups, in favor of the new flossing loops. The study concluded that the design and construction of new dental flossing techniques and aids makes their use easier and subtler, and plaque removal more effective. The loop design can enable interdental hygiene, reaching as effectiveness similar to that of traditional floss.

The present use of traditional dental floss requires a frictional force with the skin of the fingers to keep the floss mechanically resistive to perpendicular forces related to interproximal space insertion. Even if the user retains a generous extra length of floss to make some loose loops around each finger, friction force is always existent as the major mechanical element of the resistive forces. Such a result is highly variable depending on the nature of the skin, its moisture, etc. In contrast, the looped dental floss design allows a tension in excess to the traditional floss without resorting to friction at all; even if the fingers are wet, acting like mechanical pulleys, the wire is kept under a tension force that is completely imposed by the direct force that the user puts through his/her hands or arms. This restricts very significantly the variability felt by the user. In addition, the loop offers the possibility of using its complete length in cleaning, only by turning the used floss progressively, guaranteeing a high value of effectiveness of the floss. (22) However, the use of the loop still requires each space between two teeth to be individually flossed, which is time consuming and discourage use.

A lack of innovative flossing methods has resulted in a society that is too lazy to floss and care about oral health. There is a need in the art to provide additional innovative ways to reduce effort and save time flossing. Such alternative should be inexpensive for the patient so that compliance is increased in order to help in resolving the issue of poor dental hygiene and promote health care even in rural areas around the world.

SUMMARY OF THE INVENTION

Other features and advantages of the present invention will be set forth in the description of invention that follows, and in part will be apparent from the description or may be learned by practice of the invention. The invention will be realized and attained by the compositions and methods particularly pointed out in the written description and claims hereof.

The dental cleansing device provided herein is a new device that encourages more people to use dental floss. The device allows the user to clean all of the interproximal areas in between the teeth at the same time, thereby saving time and effort. This is possible because the device, which is shaped like a brace and follows the contours of the patient's gumline, holds a continuous connected floss thread that goes through all of the interproximal spaces at once when the device is used. The thread is held in place in the device with hooks that are connected to the brace (the device is a "floss brace"). The availability of the device solves problems like low frequency and duration of flossing, interdental papillary damage that can occur as a result of conventional flossing, overall improper flossing of interproximal spaces, and pressure distribution in conventional flossing that can cause bleeding due to injurious flossing. Because of its simplicity, children can learn how to floss from an early age by using the device. This device also gives the user a better insight into the amount of debris accumulated in interproximal spaces: the user flosses all interproximal spaces at once, removing all the debris at once. Seeing all the debris at once will alarm the user with respect to the large amount that can accumulate in such a narrow space and will lead to better dental awareness and improved oral hygiene.

It is an object of this invention to provide an interproximal flossing device, comprising i) a first tray comprising: i) a first inner surface and a first outer surface which together form a first trench configured to surround teeth of an upper jaw of a user, and ii) a first plurality of hooks disposed along the first inner surface, wherein the first plurality of hooks is configured to guide a first strand of dental floss threaded through each hook of the first plurality of hooks; and ii) a second tray comprising: iii) a second inner surface and a second outer surface which together form a second trench configured to surround teeth of a lower jaw of the user, and iv) a second plurality of hooks disposed along the second inner surface, wherein the second plurality of hooks is configured to guide a second strand of dental floss threaded through each hook of the second plurality of hooks; iii) a handle attached to the first tray and the second tray, wherein the handle holds the first tray and the second tray substantially parallel to each other; wherein the first plurality of floss-holding hooks positions the first strand of dental floss so as to enter the interproximal spaces between teeth in the upper jaw and the second plurality of floss-holding hooks positions the second strand of dental floss so as to enter the interproximal spaces between teeth in the lower jaw simultaneously during use. In some aspects, the interproximal flossing device further comprises at least one interproximal brush integrated into the first tray and/or the second tray. In other aspects, the interproximal flossing device comprises a first dental floss storage compartment attached to the first tray and a second dental floss storage compartment attached to the second tray. In further aspects, the first dental floss storage compartment comprises a first dental floss dispensing mechanism and the second dental floss storage compartment comprises a second dental floss dispensing mechanism. In yet further aspects, the handle comprises at least one motor that is operatively coupled to the first and second dental floss dispensing mechanisms. In other aspects, the interproximal flossing device further comprises at a first end of the first tray, a floss feeding mechanism for dispensing and optionally storing unused floss; and, at a second end of the second tray, a floss receiving mechanism for receiving and optionally storing used floss. In some aspects, the hooks are J-shaped hooks.

Also provided is a method of flossing all interproximal spaces of a subject at once, comprising inserting the interproximal flossing device into the mouth of the subject, wherein the step of inserting aligns floss in the interproximal flossing device with the interproximal spaces of the subject, and causing the subject to bite down on the interproximal flossing device, thereby inserting the floss into all interproximal spaces of a subject at once.

DETAILED DESCRIPTION

Lack of innovative flossing methods has resulted in a society that is too lazy to floss and care about oral health. Creating innovative ways to floss that reduce effort and save time and are inexpensive for the patient will help to resolve this issue and promote health care even in rural areas around the world. The population's general preference for devices rather than the conventional finger floss suggests that a wider variety of interdental cleaning devices is needed. The present disclosure is directed towards the provision of an improved and enhanced flossing device that better serves today's population, which lives in a fast-paced world of continuous advancement. The disclosed device is generally customized to fit the floss that is carriers in between the teeth of an individual, according to the placement or location of the user's teeth in the jaw. The customized device holds multiple floss threads so as to floss all the interproximal contacts between teeth at one. In addition, the device includes one or more interdental brushes in areas where the gap between two teeth is large enough to accommodate one.

The present multi-tooth flossing device is designed to fit the entire maxillary (upper) and mandibular (lower) arches once, while flossing more than one tooth at a time. The device comprises upper and lower trays designed so that, when inserted into an individual's mouth, the upper tray covers all upper teeth and the lower tray covers all lower teeth. Dental floss is positioned and held securely at positions within each tray by means of a series of hooks. As a result, when the user "bites down on" or closes their jaws sufficiently so as to insert the upper teeth into the upper tray and the lower teeth into the lower tray, floss passes between the inter-proximal spaces of all the teeth at the same time. In addition, most subject's teeth are not evenly spaced apart and some have relatively wide gaps between one or more pairs of two adjacent teeth. The device is conveniently designed so that, instead of floss being inserted between two widely-spaced apart adjacent teeth, a small dental brush is present in place of the floss. In other words, instead of floss, small brushes are located within the device so that they are inserted into the spaces between adjacent teeth that have wide interproximal spaces. Thus, the devices, when in use, generally comprises a combination of dental floss and brushes that enter the both the narrow and wide interproximal spaces of the user's teeth, respectively. In addition, the present devices can optionally comprise a compartment for storing dental floss, the compartment being operably linked to a motor which draws floss from the storage compartment and advances it into and through the hook system that holds the floss in place.

Figure 1:
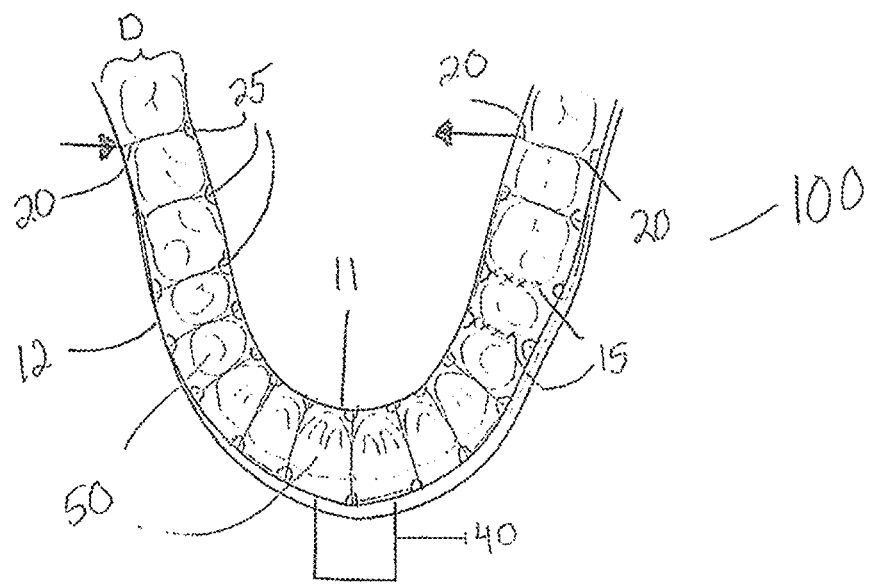
FIG. 1. Schematic representation of an exemplary tray of the device.

FIG. 1 depicts a top view of tray 10 of the device, which could be an upper or a lower tray, in place on a subject's teeth 50. Two trays, an upper and a lower tray (a "first" and "second" tray), are present in a device. Tray 10 is generally a trough or trench configured to encompass a user's teeth. Each tray comprises a first inner wall and a first outer wall which together form a trench configured to surround teeth of either the upper or lower jaw of the user. Floss 20 is shown crossing from side to side of inner wall 11 and outer wall 12 of tray 10 at positions that align the floss with interproximal spaces between the user's teeth. Generally, a tray is produced as a single, contiguous body. However, segmented trays are also encompassed.

At each position where floss 20 meets inner wall 11 or outer wall 12, hook 25 anchors floss 20 at the wall and holds it in place during use. Generally, a tray comprises a plurality of hooks 25, each of which is positioned so as not to interfere with use of the device and so as not to contact or scrape the gum of the user during insertion and use. For example, distance D between inner wall 11 and outer wall 12 (i.e. the top of the tray) is generally wide enough so that the hooks do not impinge on the user's teeth or gums. Alternatively, with reference to FIG. 2A, which shows a cross-sectional view of tray 10, each hook 25 may be positioned in an individual recess 26 in inner wall 11 and outer wall 12. Or, as shown in FIG. 2B, hooks 25 may be disposed within at least one channel 13 located along inner wall 11 and/or outer wall 12. Channel 13 can be open or it can be completely closed, encasing hooks 25. Alternatively, a combination of these placements of hook(s) 25 may be used.

Figure 2A:
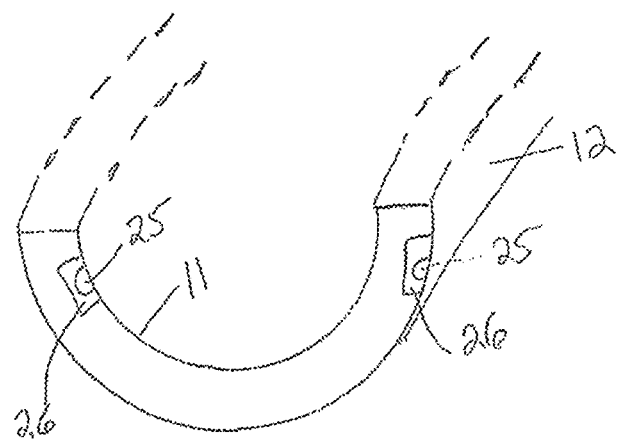
FIG. 2A-C. A, cross-sectional view of an exemplary tray with hooks in recesses; B, cross-sectional view of an exemplary tray with hooks in a channel; C, schematic of an exemplary brush.
Figure 2B:
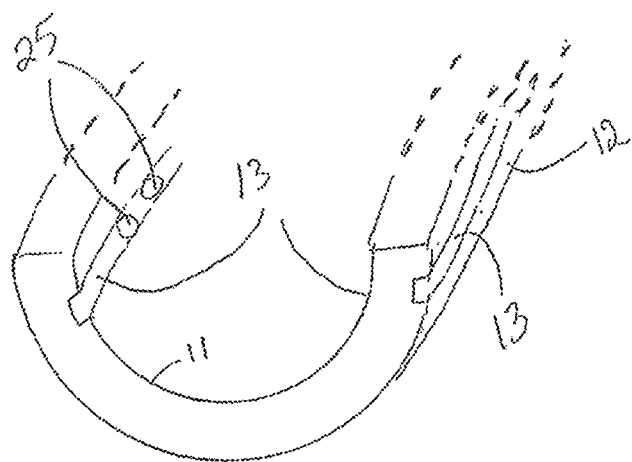

As can also be seen in the cross-sectional view of FIGS. 2A and B, in some aspects, tray 10 as formed or defined by inner wall 11 and outer wall 12 is substantially U-shaped, although other shapes (e.g. square, rectangular, V-shaped, etc.) are also encompassed, as long as the user's teeth and the floss and brushes can all be accommodated as needed for use.

While hooks 25 hold floss 20 during use of the device, the association of the hooks and the floss is generally not permanent. Rather, the floss is received and held temporarily (reversibly) by the hooks and guided along a suitable route back and forth across the tray to fit between interproximal spaces and replaced at the user's discretion.

Figure 3A:
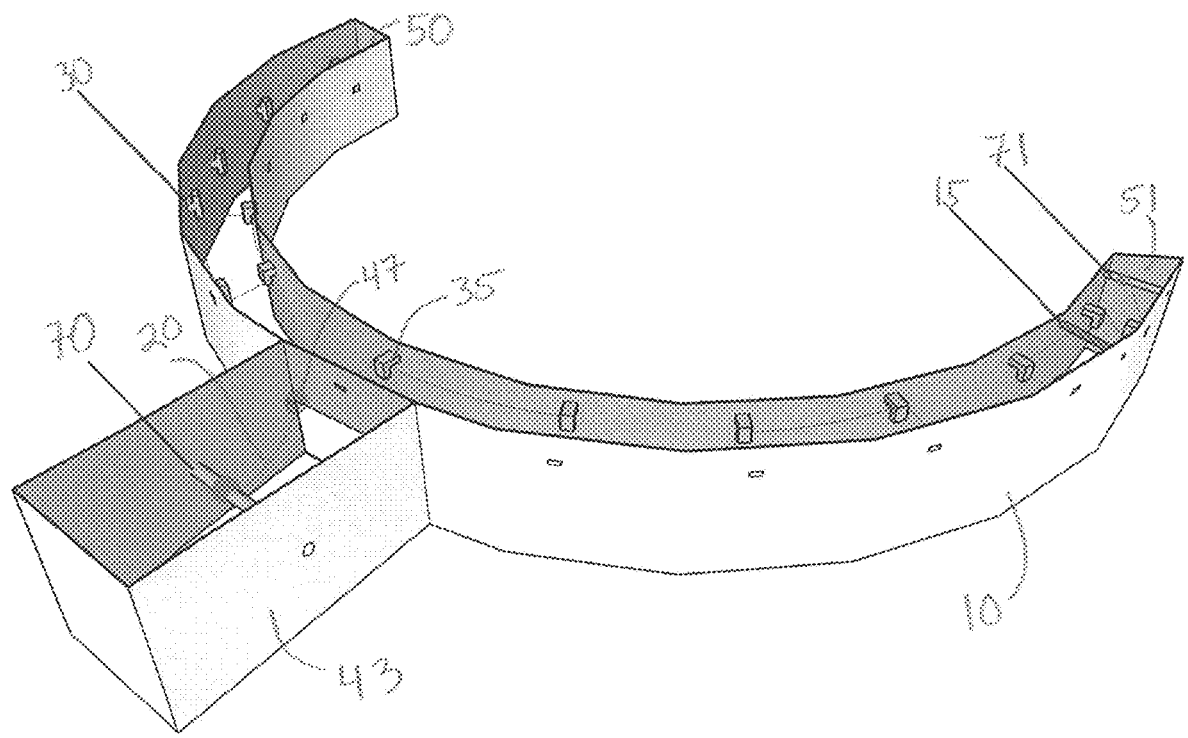
FIG. 3A-D. Exemplary view of a tray; B, close-up of one end of a trench with double J hooks; C, close-up of the end of a trench with receiving wheel which receives used floss and attachment sites for an interdental brush; D, close-up of the view of C but with interdental brush in place.

To fulfil the function of hooks 25, in some aspects shown in FIG. 3A, two types of J-shaped hooks can be used, one double J hook 30 and single J hook 35. Typically, as shown in FIG. 3A, there are two ends of tray 10, end 50 and end 51. In some aspects, double J hooks 30 are placed only on one side of the brace (e.g. near end 50) to direct the floss to start from the beginning of the lower/upper arch. To insert new floss into the tray, floss 20 first rolls from feeding wheel 70, passes through and/or around double J hooks 30, and eventually goes through all single J hooks 35, ending at receiving wheel 71 that receives the end of clean floss in the beginning, and then dirty floss as the device is used and used floss is replaced.

Figure 3B:
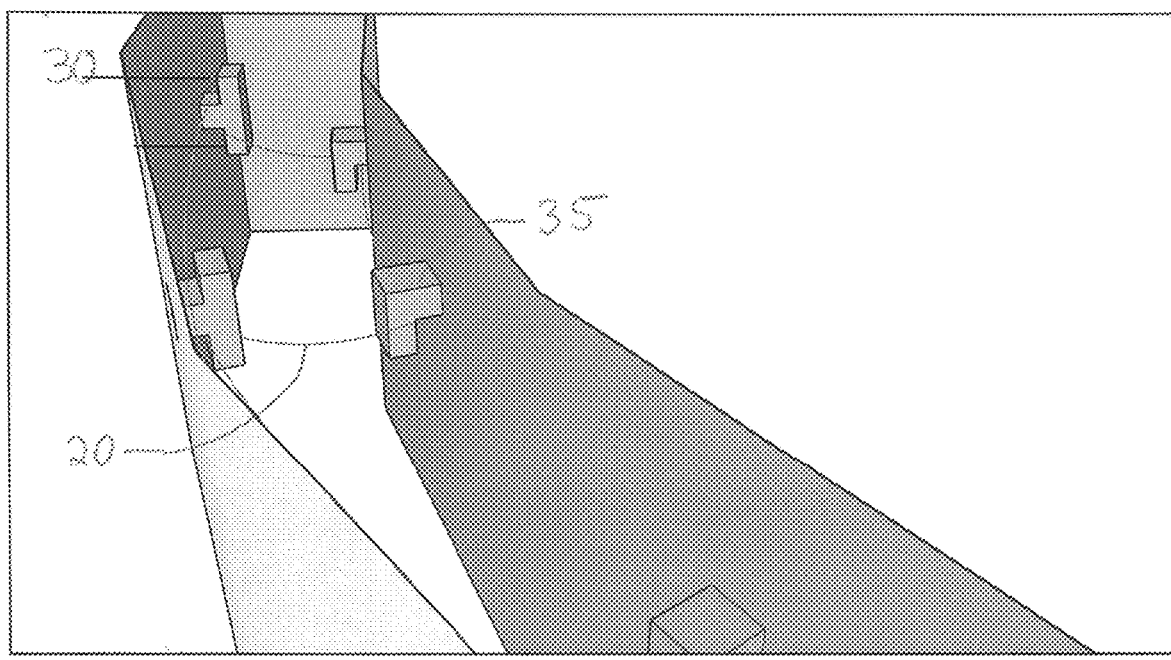

Generally, the placement of components in tray 10 proximate to (near, close to) end 50 is not the same as those near end 51. As an example, in some aspects, the section of tray 10 near end 50, shown enlarged in FIG. 3B, includes double J hooks 30 on an exterior face of the channel wall and single J hooks 35 on the interior face of the channel wall. Floss is dispensed from a dental floss dispensing mechanism such as (or which comprises) feeding wheel 70 (FIG. 3A) and is connected to double J hooks 30 to load the device prior to use. Floss is then strung between J hooks 35 (FIG. 3B) and crosses the channel to be looped around a double J hook 30, to create the desired pattern of floss lined up with the interdental spaces of the user. It is noted that a double J hook 30 can receive and carry a strand of floss twice (one for loading floss and once for receiving floss from a single J hook), whereas a single J hook 35 receives floss only once.

Figure 3C:
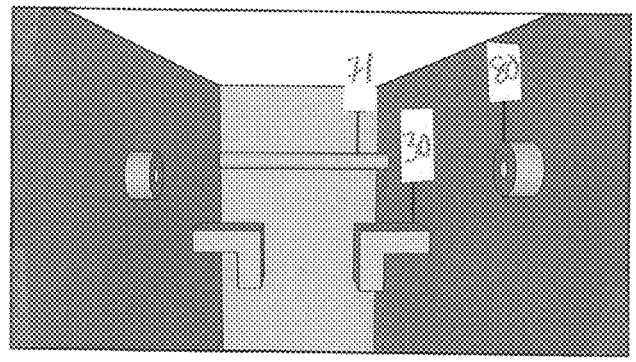
Figure 3D:
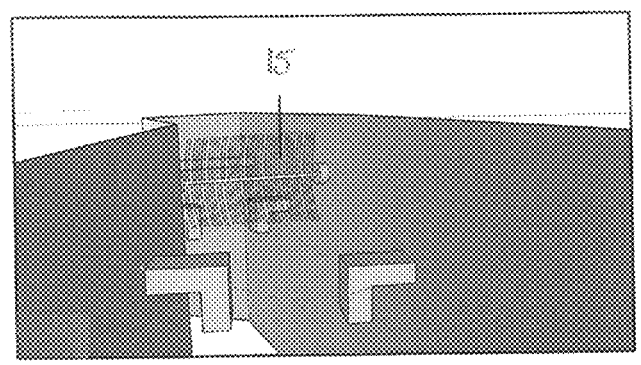

As a further example, in some aspects, the section of tray 10 near end 51, shown enlarged in FIG. 3C, includes receiving wheel 71 which receives used floss. Also shown in FIG. 3C are single J hooks 35 and attachment sites 80 for an interdental brush 15. FIG. 3D shows this same view with interdental brush 15 in place.

In some aspects, floss 20 is inserted manually for the first time starting from feeding wheel 70 (FIG. 3A) until it reaches receiving wheel 71 in the tray. These two wheels act opposite to each other to ensure proper floss movement, and they work only when the user has finished flossing and needs to exchange the used floss for new, unused floss. This dynamic is shown in FIG. 3A. The image also shows the area in which interdental brush 15 is inserted and clinically positioned where there is a gap between the teeth that cannot be sufficiently cleaned with a strand of floss. It is noted that the floss thread will not intersect with the interdental brush as they are placed at different heights. As shown in FIGS. 3C and 3D, the single J hooks 35 hold the floss threads at a lower height than the interdental brush.

As discussed above, FIG. 3A shows that compartment 43 typically comprises feeding wheel 70 (which may be a spooling device) where floss 20 is stored prior to use and from which floss 20 is dispensed. As it is dispensed (e.g. unwound), floss 20 exits compartment 43 e.g. through aperture 47 and enters tray 10 where it is received and guided along the unidirectional (one-way) path by double J hooks 30, as shown. Alternatively, aperture 47 may be a slit (or hole or via) or a cut or cutout or vertical depression disposed in the top of the tray 10 e.g. for manual or automated installation of floss 20.

The dynamic of the automatic feeding in and feeding out of the floss is that, as shown in FIG. 3A, feeding wheel 70 feeds new clean floss to the entire tray 10 and receiving wheel 71 works at the same time to receive dirty floss (albeit the first time the tray is loaded, the floss received by receiving wheel 71 has not yet been used). In the beginning, the user manually sets the floss direction by inserting it in the correct manner into the hooks. However, this is only for the first time of use to set the floss in the proper direction. Thereafter, movement of the floss is automatically driven by a motor (described below) and the wheels roll the floss in and through the entire device. Receiving wheel 71 rotates in the opposite manner of feeding wheel 70: feeding wheel 70 rotates in a clockwise manner and receiving wheel 71 rotates in a counter-clockwise manner, so that they both work together to provide new clean floss for every use and to discard dirty floss onto receiving wheel 71.

Figure 2C:
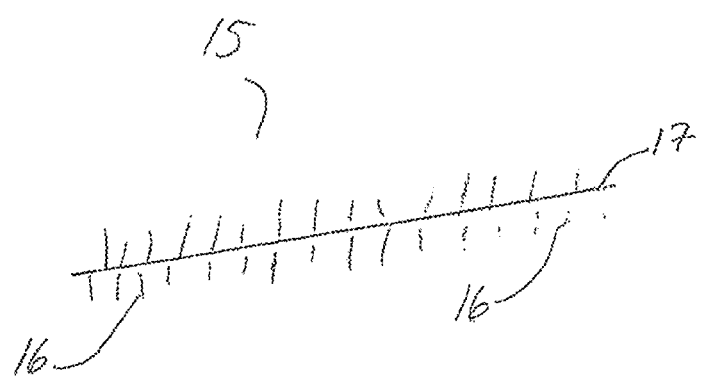

As shown in FIG. 1, tray 10 generally typically comprises one or more interdental brushes 15. With referenced to FIG. 2C, interdental brush 15 generally comprises bristles 16 supported on linear support 17 as shown in FIG. 2C. The ends of each brush 15 may be anchored or attached to inner wall 11 and outer wall 12 by attachment means 80 e.g. as described as shown in detail in FIG. 3C. Brush 15 is depicted as straight in FIG. 2C and may also be in different sizes from small to medium according to the gap examined intraorally in the user's mouth. The size of the interdental brush has to accommodate the size of the gap in order to competently clean the area. In addition, bristles 16 may all be the same length or may be of varying lengths, e.g. to provide close contact with the surfaces of the two teeth between which brush 15 is inserted during use. Brushes 15 may be, like floss 20, temporarily attached to tray 10, i.e. brushes 15 are disposable and suitable for a single (one time) use or a few uses until the brush no longer cleans because of the accumulated debris or because the bristles are damaged, and then replaced. In this aspect, the attachment may be via attachment means 80 (e.g. hooks, slots, a snapping mechanism, etc.). Replacement is generally performed by the user.

Alternatively, in some aspects, brushes 15 are securely and permanently (irreversibly) attached to tray 10. In this latter case, the ends of brush 15 are securely embedded into tray 10 and brushes 15 can be cleaned between uses.

Typically, a flossing device 100 of the invention comprises two trays 10 (as described above) attached to a handle (handle 40 in FIG. 1). This aspect is shown in detail in FIG. 4A-C, which depict an offset side view, a side view and a rear view, respectively. As can be seen, device 100 comprises two trays 10 (an upper and a lower tray) attached to handle 40. Handle 40 typically comprises two sections, section 41, which attaches directly to two trays 10, and section 42, configured to be gripped by the user during use. Sections 41 and 42 may be contiguous of integral with each other (e.g. molded or manufactured as a single part, i.e.) or may be produced separately and attached to each other when device 100 is manufactured. Similarly, trays 10, section 41 and section 42 may be molded or manufactured as a single contiguous object, or two or more of trays 10, section 41 and section 42 may be manufactured separately and joined together to form device 100.

Figure 4A:
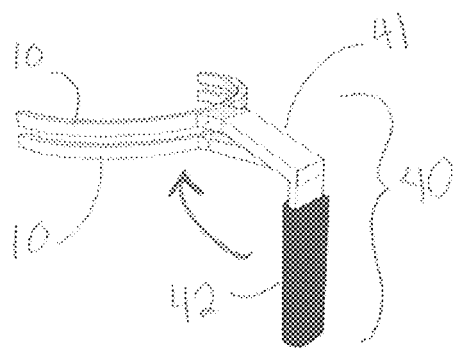
FIG. 4A-E. Schematic representations of A, a view of an exemplary device at an angle; B, a view of an exemplary device from the side; C, a view of an exemplary device from the rear; D, a view of an exemplary device showing interior of storage compartment for floss; E, the storage compartment with cover in place.
Figure 4B:
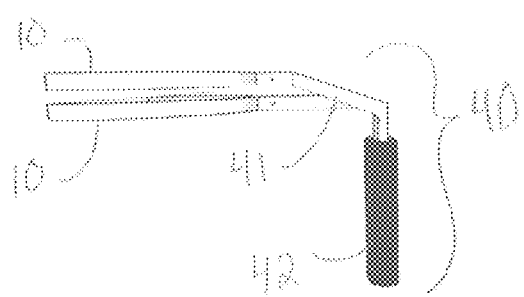
Figure 4C:
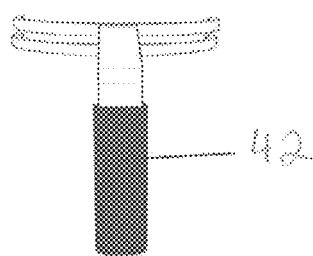

Sections 41 and 42 may be positioned with respect to each other in an angular manner, so that section 42 is substantially perpendicular to section 41, as shown in FIG. 4A-C. However, handle 40 may also have an overall curved shape. In addition, handle 40 may be e.g. size-adapted to fit the hand of an adult or a child or a right- or left-handed user. In some aspects, two sections 42 may be attached to section 41 so that e.g. a child can hold device 100 with two hands. Finger grips may be present e.g. on a surface of section 42 and/or section 42 may be ergonomically designed to conform comfortably to the hand. In some aspects, handle 40 is hinged so that it can be folded or flipped toward trays 10 for easy storage, for travel, etc., as indicated by the arrow in FIG. 4A. The hinge or coupler can be a spring-loaded hinge or a linkage, or the like. In further aspects, the handle may be detachable or removable. A detachable handle may be useful, e.g. as a child grows and a new fitting is needed to make new trays adapted to changes in tooth size, number, etc. The original handle may be used with the new trays, which are e.g. snapped into place.

Figure 4D:
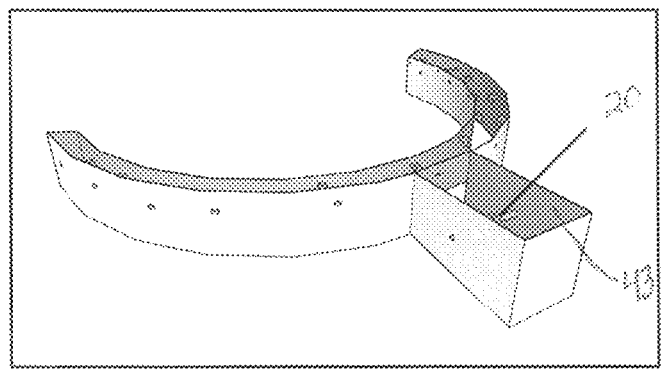
Figure 4E:
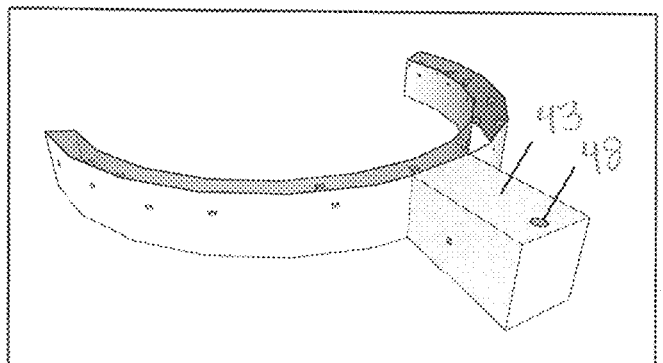

Generally, floss 20 is anchored at one end in compartment 43. A close-up view of compartment 43 (with cover removed) on one tray of the device is shown in FIG. 4D. A similar close-up view of compartment 43 (with cover) on one tray of the device is shown in FIG. 4E, which includes an optional aperture 48.

The multi-tooth flosser 100 can be designed to be used permanently with dispensable dental floss, semi-permanently until the secured dental floss wears out or has been used multiple times, or designed for one time use of the floss, or even one-time use of the entire device. The dental floss can be installed by the manufacturer such that the dental floss cannot be removed by the consumer. However, generally the consumer can manually install the dental floss and a motor may be present to advance floss through the device.

Figure 5A:
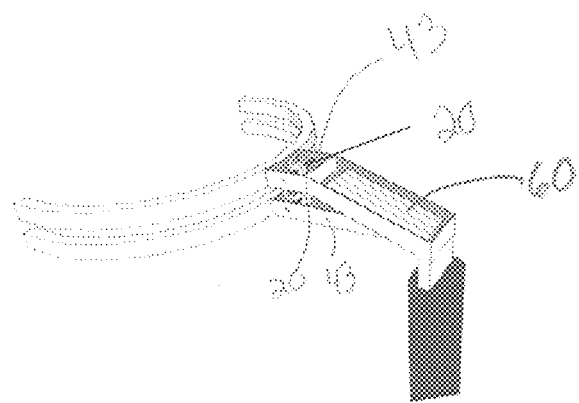
FIG. 5A-C. A, device showing motor; B, device showing motor and switch; C, alternate view of device with switch.

In some aspects, as shown in FIG. 5A, floss 20 is moved along the path by motor 60. Motor 60 is typically housed in handle 40, although it can also be installed on an upper or lower surface of the handle. Operation of the motor advances new floss into trays 10 and may also move the floss and/or brushes to clean the interproximal spaces. For example, the floss and the brushes can be moved up and down, side-to-side, rotated, vibrated, etc. during use.

Figure 5B:
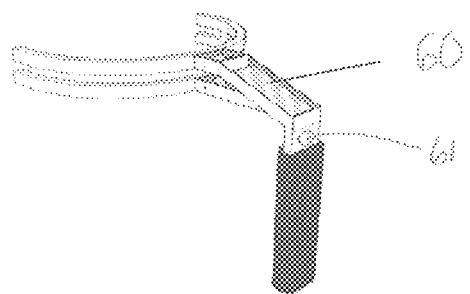
Figure 5C:
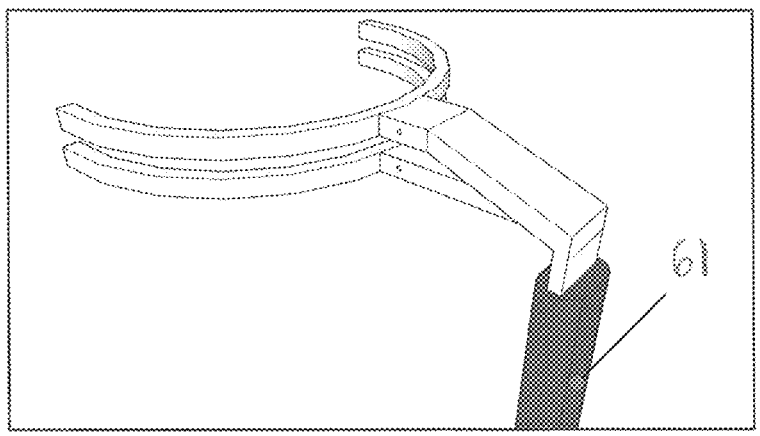

Generally, the motor is controlled by an actuator which is actuated e.g. by switch 61 disposed on handle 40, as shown in FIG. 5B. An alternative placement of switch 61 is shown in FIG. 5C. Switch 61 generally has "on" and "off" positions that control turning the motor on and off and may also provide "intermediate" speeds. Motors suitable for use are known in the art and include but are not limited to those used in e.g. electric toothbrushes, as described in issued U.S. Pat. Nos. 10,778,076; 10,765,323 and 10,743,650, the complete contents of each of which is hereby incorporated by reference in entirety. The motor may be driven by direct connection of the device to a power source such as an electrical outlet. Alternatively, the device may include a battery (e.g. disposed within the handle) and a charging stand to replenish the battery.

Design and Manufacture

The multi-tooth flossing device disclosed herein is generally designed to be custom-based (i.e., individualized for each patient's needs). For a custom-made device, a dental professional obtains at least one impression for each user (e.g. an impression of the upper and lower teeth and gums) and the device is manufactured according to the specifications of the impression(s). Methods and materials for obtaining an impression of a subject's mouth, jaws and teeth are known in the art, such as those employed for manufacturing dental prostheses described in issued U.S. Pat. Nos. 10,646,310; 10,603,142 and 10,524,650, the complete contents of each of which is hereby incorporated by reference in entirety. In some aspects, the impressions are digital impressions obtained using 3D intraoral scanning. In further options, 3D printing technology is also used to manufacture the device easily and on the spot for the patient, which eliminates lengthy wait times.

Tray 10 and/or handle 40 can be comprised of any of several different materials, as long as the materials are biocompatible with use in the mouth. Dental casting alloys may be utilized, which provide many benefits. Dental casting alloys are biocompatible, provide an easy means for melting, casting, brazing, or polishing, there is little shrinkage, a high wear resistance, a high strength, low sag resistance, and a high tarnish or corrosion resistance. Specific examples of metals used for dental casting alloys can include but are not limited to: palladium, copper, silver, cobalt, gold, and gallium. Tray 10 and/or handle 40 can also be comprised of a base metal alloy, such as nickel, chromium, cobalt, molybdenum, aluminum, and the like. Another material that may be utilized is stainless steel. Tray 10 and/or handle 40 can be comprised of denture base polymers. A sample of a denture base polymer is based on poly (methyl methacrylate) powder and a monomer mixture (liquid) of methyl methacrylate and a cross-linking dimethacrylate monomer such as ethylene glycol dimethacrylate (EGDMA). Tray 10 and/or handle 40 can be comprised of synthetic polymers such as polymethyl methacrylate and its copolymers or of a plastic resin such as utilized in dentures. Another material that can be utilized is a resin-based material including composites, resin modified glass ionomers and componomers. In one aspect, the multi-tooth flosser 100 can be constructed using a procedure using plastic and/or Ethyl Vinyl Acetate (EVA) sheets and a STA-VAC Vacuum Machine as described, for example, in US patent application US20060014121, the complete contents of which is hereby incorporated by reference in entirety. Further similar features that are known in the art are included in issued U.S. Pat. Nos. 9,084,655 and 8,091,567, and U.S. patent application Ser. No. 10/582,989, the complete contents of each of which is hereby incorporated by reference in entirety.

Multi-tooth flosser 100 can be designed to custom fit a particular individual's mouth. Alternatively, the device may be a universal-type multi-tooth flosser available in, for example, standard sizes such as small, medium and large. The dimensions of tray 10 can vary having a length of about 2 inches to about 3 inches, with a width of about 2 inches to about 4 inches. The height of the tray is dependent upon the type of tray utilized. However, especially for custom-fabricated devices, all dimensions depend on the dimensions of the mouth/teeth of the user.

All varieties of dental floss can be utilized in the multi-tooth flosser. Several examples of dental floss include, but are not limited to, waxed or unwaxed, flavored or unflavored, and regular or tape types. Bristled dental floss as described in issued U.S. Pat. No. 10,624,724, the complete contents of which is hereby incorporated by reference in entirety, may be used. Similarly, all varieties of interproximal brushes may be used, such as those described in issued U.S. Pat. Nos. 9,220,336 and 10,231,809, the complete contents of each of which is hereby incorporated by reference in entirety.

Use

In use, the multi-tooth flosser is positioned such that it is to be disposed in a mouth. The user opens their mouth and positions the multi-tooth flosser in the interior of the mouth in alignment with the teeth to be flossed. The relative positions of upper and lower trays 10 is fixed at a distance that permits the user to bite into the two trays simultaneously in a manner that inserts the dental floss and/or brushes that are positioned within the trays into the interproximal spaces of the used teeth. The depth of insertion is predetermined, e.g. during custom-fittings, and the tension on the floss can be adjusted, so that the floss does not cut into the gum but can be inserted just below the gumline on the side of each of the two teeth that are separated by the interproximal space. In some aspects, by manually applying pressure on the exterior of the tray (e.g. upward and/or downward movement of the handle), or automatically, the dental floss is moved up and down in the inter-proximal spaces of all teeth at the same time. Generally, the teeth will contact the interior bottom of tray 10 as the dental floss passes between the teeth, providing a stopping point or maximum distance of insertion of the floss. This movement removes particulate matter and also disrupts the biofilm that forms on tooth surfaces. When flossing is complete, the subject opens the jaws and releases the trays of the device. After use, used floss and brushes can be removed as described above, and/or the device can be cleaned and/or sterilized before the next use, as needed.

It is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range. Where the stated range includes one or both of the limits, ranges excluding either or both of those included limits are also included in the invention.

Unless defined otherwise, all technical and scientific terms used herein have the same meaning as commonly understood by one of ordinary skill in the art to which this invention belongs. Representative illustrative methods and materials are herein described; methods and materials similar or equivalent to those described herein can also be used in the practice or testing of the present invention.

All publications and patents cited in this specification are herein incorporated by reference as if each individual publication or patent were specifically and individually indicated to be incorporated by reference, and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual dates of public availability and may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as support for the recitation in the claims of such exclusive terminology as "solely," "only" and the like in connection with the recitation of claim elements, or use of a "negative" limitations, such as "wherein [a particular feature or element] is absent", or "except for [a particular feature or element]", or "wherein [a particular feature or element] is not present (included, etc.) . . . ".

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order which is logically possible.

The invention is further described by the following non-limiting examples which further illustrate the invention, and are not intended, nor should they be interpreted to, limit the scope of the invention.

While the invention has been described in terms of its several exemplary embodiments, those skilled in the art will recognize that the invention can be practiced with modification within the spirit and scope of the appended claims. Accordingly, the present invention should not be limited to the embodiments as described above, but should further include all modifications and equivalents thereof within the spirit and scope of the description provided herein.

We claim:

1. A customizable interproximal flossing device, comprising
    i) a first tray formed as a single contiguous body comprising a first inner surface and a first outer surface, which together form a first trench configured to surround teeth of an upper jaw of the user, having a first plurality of hooks disposed along and connected to the first inner surface according to the locations of the teeth of the upper jaw, wherein the first plurality of hooks is configured to guide a first strand of dental floss threaded through each hook of the first plurality of hooks;
    ii) a second tray formed as a single contiguous body comprising a second inner surface and a second outer surface, which together form a second trench configured to surround teeth of a lower jaw of the user, having a second plurality of hooks disposed along and connected to the second inner surface according to the locations of the teeth of the lower jaw, wherein the second plurality of hooks is configured to guide a second strand of dental floss threaded through each hook of the second plurality of hooks; and
    iii) a handle attached to the first tray and the second tray, wherein the handle holds the first tray and the second tray substantially parallel to each other;
    wherein the first plurality of floss-holding hooks positions the first strand of dental floss so as to enter the interproximal spaces between the teeth in the upper jaw and the second plurality of floss-holding hooks positions the second strand of dental floss so as to enter the interproximal spaces between the teeth in the lower jaw simultaneously during use; and
    wherein the first trench comprises two closed ends and the second trench comprises two closed ends.

2. The customizable interproximal flossing device of claim 1, further comprising at least one interproximal brush integrated into the first tray and/or the second tray and configured so as to be inserted, in place of the dental floss, into an interproximal space between adjacent teeth.

3. The customizable interproximal flossing device of claim 1, further comprising a first dental floss storage compartment attached directly to the outer surface of the first tray and a second dental floss storage compartment attached directly to the outer surface of the second tray, wherein the first dental floss storage compartment and the second dental floss storage compartment each comprise a cover.

4. The customizable interproximal flossing device of claim 3, wherein the first dental floss storage compartment comprises a first dental floss dispensing mechanism and the second dental floss storage compartment comprises a second dental floss dispensing mechanism.

5. The customizable interproximal flossing device of claim 1, wherein the handle comprises at least one motor that is operatively coupled to the first and second dental floss dispensing mechanisms.

6. The customizable interproximal flossing device of claim 1, further comprising
    at a first end of the first tray, a floss feeding mechanism for dispensing floss; and,
    at a second end of the second tray, a floss receiving mechanism for receiving used floss.

7. The customizable interproximal flossing device of claim 1, wherein the hooks are J hooks.

8. The customizable interproximal flossing device of claim 6, wherein the floss feeding mechanism also stores unused floss.

9. The customizable interproximal flossing device of claim 6, wherein the floss receiving mechanism also stores used floss.

10. The customizable interproximal flossing device of claim 2, wherein ends of each interproximal brush are attached to the inner wall and the outer wall of the first tray or the inner wall and the outer wall of the second tray.

11. An interproximal flossing device customizable for a user, comprising
    i) a first tray produced as a single contiguous body comprising:

a first inner surface and a first outer surface, which together form a first trench configured to surround teeth of an upper jaw of the user, and a first plurality of hooks disposed along the first inner surface, wherein the first plurality of hooks is configured to guide a first strand of dental floss threaded through each hook of the first plurality of hooks;

ii) a second tray produced as a single contiguous body comprising:

a second inner surface and a second outer surface which together form a second trench configured to surround teeth of a lower jaw of the user, and a second plurality of hooks disposed along the second inner surface, wherein the second plurality of hooks is configured to guide a second strand of dental floss threaded through each hook of the second plurality of hooks; and iii) a handle attached to the first tray and the second tray, wherein the handle holds the first tray and the second tray substantially parallel to each other;

wherein the first plurality of floss-holding hooks positions the first strand of dental floss so as to enter the interproximal spaces between teeth in the upper jaw and the second plurality of floss-holding hooks positions the second strand of dental floss so as to enter the interproximal spaces between teeth in the lower jaw simultaneously during use; and wherein the interproximal flossing device further comprises at least one interproximal brush integrated into the first tray and/or the second tray and configured so as to be inserted, in place of the dental floss, into an interproximal space between adjacent teeth.

12. The customizable interproximal flossing device of claim 1, wherein each hook is positioned in an individual recess.

13. The customizable interproximal flossing device of claim 1, wherein the first plurality of hooks is disposed within a first channel and the second plurality of hooks is disposed within a second channel.

\* \* \* \* \*